United States Patent
Lazarz et al.

(10) Patent No.: US 8,290,660 B2
(45) Date of Patent: Oct. 16, 2012

(54) DATA ACCESS TO ELECTRONIC CONTROL UNITS

(75) Inventors: Stanislaw Lazarz, Huddinge (SE); Kurt Flatischler, Boras (SE)

(73) Assignee: Scania CV AB (publ) (SE)

( * ) Notice: Subject to any disclaimer, the term of this patent is extended or adjusted under 35 U.S.C. 154(b) by 1345 days.

(21) Appl. No.: 11/091,996

(22) Filed: Mar. 29, 2005

(65) Prior Publication Data

US 2005/0222718 A1 Oct. 6, 2005

(30) Foreign Application Priority Data

Mar. 30, 2004 (SE) ...................................... 0400827

(51) Int. Cl.
G06F 19/00 (2011.01)
G06F 21/00 (2006.01)
H04L 9/32 (2006.01)

(52) U.S. Cl. ...................... 701/32.6; 701/29.1; 701/31.4; 701/315; 340/5.2; 340/5.8; 340/5.81; 340/5.85; 340/5.86; 713/162; 713/168; 713/169; 713/172; 713/182; 713/183; 713/185; 726/2; 726/4; 726/5; 726/9; 726/17; 726/18; 726/20

(58) Field of Classification Search .......... 340/5.1–5.28, 340/5.5–5.86; 701/1, 29–36; 711/163, 164; 380/277, 278, 283; 713/162–172, 182, 183, 713/185, 186; 726/2–10, 16–20

See application file for complete search history.

(56) References Cited

U.S. PATENT DOCUMENTS

| | | | |
|---|---|---|---|
| 4,864,494 A * | 9/1989 | Kobus, Jr. ...................... | 726/33 |
| 5,521,588 A | 5/1996 | Kuhner et al. ............ | 340/825.22 |
| 5,774,550 A * | 6/1998 | Brinkmeyer et al. .......... | 713/168 |
| 5,787,367 A | 7/1998 | Berra ................................. | 701/1 |
| 5,968,175 A * | 10/1999 | Morishita et al. ................ | 726/28 |
| 6,236,909 B1 * | 5/2001 | Colson et al. ...................... | 701/1 |
| 6,556,904 B1 * | 4/2003 | Larson et al. .................... | 701/33 |
| 6,574,734 B1 * | 6/2003 | Colson et al. .................... | 726/21 |
| 6,604,024 B2 * | 8/2003 | Braun et al. ....................... | 701/1 |
| 6,819,986 B2 * | 11/2004 | Hong et al. ...................... | 701/29 |
| 6,981,150 B2 * | 12/2005 | Little et al. ..................... | 713/191 |

OTHER PUBLICATIONS

I. Kreuz, et al., "Exact Configuration Onboard-Onboard Documentation of Electrical and Electronic Systems consisting of ECUs, Data Buses and Software", Daimler-Chrysler AG, ERA Conference 1999, Coventry, pp. 5.2.1-5.2.8. ff, 1999.

* cited by examiner

*Primary Examiner* — John Nguyen
*Assistant Examiner* — Chuong Nguyen
(74) *Attorney, Agent, or Firm* — Ostrolenk Faber LLP

(57) ABSTRACT

To provide external access to a specification file stored in at least one memory unit, which is associated with at least one electronic control unit which may be in a vehicle, a computer is connected to a first communication bus in the vehicle. A first module in the computer is adapted to communicate with the at least one electronic control unit over the first communication bus. Provided that a user-unique key is connected to a port of the computer and a software component of this key is set to an active authorization state, the computer is enabled to communicate with the at least one electronic control unit. Thus, the computer may read out the specification file as well as update the specification file.

8 Claims, 2 Drawing Sheets

DATA ACCESS TO ELECTRONIC CONTROL UNITS

BACKGROUND OF THE INVENTION AND PRIOR ART

Figure 1:
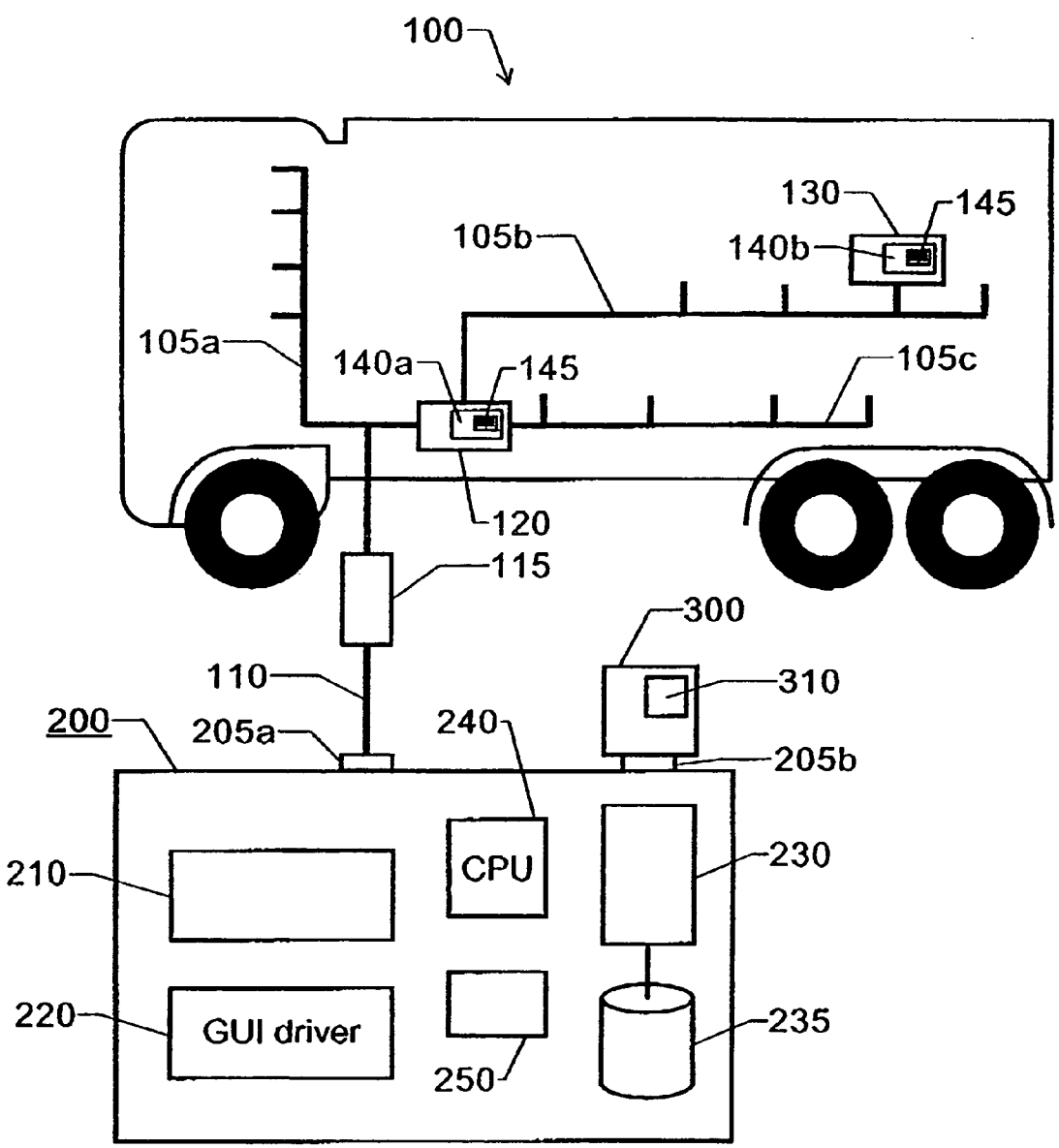

The present invention relates generally to programming of electronic control units (ECUs) in vehicles. More particularly the invention relates to an arrangement which enable access to a specification file in a memory unit using a special type of key, particularly useful for a motor vehicle. The invention also relates to a method of accessing such a specification file using a special key, a computer program adapted to control the method and a computer readable medium with control for the operations.

In order to improve the efficiency and flexibility, the automotive industry has developed towards an increased use of network solutions for controlling various kinds of units and processes in the vehicles. For instance, the Controller Area Network (CAN), the Time Triggered CAN (TTCAN), the FlexRay, the Media Oriented System Transport (MOST) and the ByteFlight standards specify means of accomplishing these types of networks in trucks, busses and other motor vehicles. By means of a CAN, or a similar network, a very large number of vehicle functions may be accomplished based on relatively few ECUs. Namely, by combining resources from two or more ECUs a flexible and efficient overall vehicular design is obtained. Moreover, multiple networks in a vehicle may be interconnected, so that ECUs belonging to different networks in the vehicle may exchange information. Typically, an ECU is used also to accomplish this bridging between the networks.

Naturally, in service and repair situations as well as when a vehicle is modified or rebuilt, it may be necessary to change or update control parameters, software etc in the ECUs. Therefore, it is generally essential that an external access be provided to the relevant ECUs and their memories, i.e. that a computer, which is normally not located on board the vehicle, can be connected to the vehicle when for example the vehicle visits a workshop.

The prior art includes various examples of solutions which allow an external computer access to a memory of an ECU. For instance, U.S. Pat. No. 5,787,367 describes a system for providing a secured programming/reprogramming of an onboard vehicle system. An interface tool here interconnects a selected onboard computer system and an authorized database. Thereby, after having performed a password and identification check, the interface tool establishes an encrypted connection between the selected onboard computer system and the authorized database, which is a central network resource. As a result, the authorized database may transfer data to the onboard computer system.

U.S. Pat. No. 5,521,588 discloses a solution according to which a local programming of a control device in a vehicle is accomplished. An external test device here transfers the contents of a data carrier to a vehicle configuration memory of a central control device in the vehicle. This transfer is performed via a plug-in connection to the central control device. The described programming is preferably carried out in connection with replacement, or so-called retrofitting, of a control device, such that old vehicle configuration data are overwritten with relevant current data.

The document I. Kreuz et al., "Exact Configuration Onboard—Onboard Documentation of Electrical and Electronic Systems consisting of ECUs, Data Busses and Software", Daimler-Chrysler AG, ERA Conference 1999, Coventry, p. 5.2.1 ff, 1999 describes a solution wherein data regarding the exact configuration onboard (ECO) of a particular vehicle is stored in a central ECU of this vehicle. Thereby, any after sales departments may obtain technical information relevant for service, repair or extension operations by plugging in an external computer to the central ECU and reading out the vehicle's ECO.

Thus, there exist alternative means to read out and modify various data in devices and control units of a vehicle. However, none of the known solutions is fully satisfying, since flexibility cannot be provided while ensuring data authenticity. An encrypted online connection to a central resource, of course, vouches for the integrity of the data that is to be stored in a vehicular module. However, such a connection requirement renders the overall system vulnerable and relatively inflexible.

On the other hand, a strictly local solution, may indeed be flexible. Nevertheless, since no authentication system or corresponding security features are provided, the system becomes very vulnerable. Namely, without access restrictions, anyone may feed in any kind of data into the vehicular modules, and therefore the data quality may deteriorate drastically.

SUMMARY OF THE INVENTION

The object of the present invention is therefore to provide a solution, which alleviates the above-mentioned problems, and thus offers a secure and flexible access to an on-board specification file.

According to one aspect of the invention, the object is achieved by the initially described arrangement, wherein a user-unique key is adapted to be connected to a port of the computer. The key includes a software component, which is associated with an authorization state that may be set either active or inactive. The key is adapted to control the communication between the computer and the electronic control unit, such that the computer is only enabled to communicate with the electronic control unit if the key is connected to the computer and the key's software component is associated with the active authorization state.

An important advantage attained by this arrangement is that, in addition to accomplishing an authorized data access, the key's software component may hold data which can be used for widely diverse purposes. Consequently, a high degree of flexibility is provided. For instance, the software component may include an encryption key and user identity information, which in turn, may be associated with an individual access level.

According to one embodiment of this aspect of the invention, the first module is adapted to store log data in the specification file. This log data pertains to any specification-file-related communication between the computer and the electronic control unit. The log is advantageous because it creates revision data for the specification file, which tracks all modifications made to the file. Thereby, future modifications to the vehicle as well as fault diagnosis operations are facilitated.

According to another embodiment of this aspect of the invention, the log data specifies at least one of a user ID of the user-unique key, a time stamp and information pertaining to a subject of the communication. In so doing, the log data contains a kind of "fingerprint" that reflects who did what modification at which point in time. Naturally, this further enhances the efficiency of any future modifications and/or fault diagnosis operations performed in respect of the vehicle.

According to yet another embodiment of this aspect of the invention, the subject of the communication relates to a read-out of the specification file from the memory unit and/or an update of the specification file in the memory unit. Consequently, not only data updates are made possible, however pure data read-outs may be performed, and these operations also create tracks in the log data.

According to still another embodiment of this aspect of the invention, the arrangement comprises an interface unit, which inter-connects the first communication bus and an external communication bus. The latter, in turn, is connected to a port of the computer. The first communication bus has a first format which is different from a second format of the external communication bus. Hence, the interface unit is adapted to convert communication signals between the first and second formats. The interface unit is desirable because, normally, the vehicle's internal bus uses a different format than the external computer.

According to yet another embodiment of this aspect of the invention, the computer is associated with a database defining identities of any unacceptable user-unique keys. Moreover, the computer includes a third module, which is adapted to compare the identity of a user-unique key connected to the computer with the information in the database. If, in the light of the database information, the key is found to be unacceptable, the computer sets key's software component to the inactive authorization state. This is advantageous because thereby a central access control may be provided without requiring an online connection to a central authorized database. Instead, information about unauthorized user identities (i.e. unacceptable user-unique keys) may regularly be sent out from a central resource to all users of the system (for example in connection with monthly general software updates). Hence, the database may be used to discard expired or stolen keys. Of course, the database may either contain information pertaining to unauthorized or authorized user identities, so that, depending on which, a match in a relevant data field should either be avoided or should occur in order to gain access to the specification file data.

According to another aspect of the invention, the object is achieved by a motor vehicle that both includes at least one ECU, which is associated with at least one memory unit, and the above-proposed arrangement. Naturally, such a vehicle is advantageous for the same reasons as the arrangement per se.

According to another aspect of the invention, the object is achieved by a method of accessing a specification file, which is stored in a memory unit associated with an electronic control unit in a vehicle. The electronic control unit is further presumed to be connected to a first communication bus in the vehicle. The method involves checking an authorization state of a software component of a user-unique key connected to a port of a computer. This computer is adapted to communicate with the electronic control unit over the first communication bus. Provided that the software component of the connected key is associated with the active authorization state, the method involves enabling the computer to communicate with the electronic control unit.

Since, besides accomplishing an authorized data access, the key's software component may hold data which can be used for widely diverse purposes, a high degree of flexibility is provided. For instance, the software component may include an encryption key and user identity information, which in turn may be associated with an individual access level. These features are desirable in many applications, such as when the data access is to be different for different users.

According to one embodiment of this aspect of the invention, the communication involves reading out the specification file from the memory unit to an external memory unit associated with the computer. The communication may also involve updating the specification file in the memory unit with a contents of the external memory unit which is associated with the computer. Thereby, a full data access to the specification file is offered.

According to another embodiment of this aspect of the invention, the method involves logging data in respect of any specification-file-related communication between the computer and the electronic control unit in the specification file. Thus revision data is created for the specification file, which tracks all modifications made to the file. Thereby, future modifications to the vehicle as well as fault diagnosis operations are facilitated. For example, data log may include a user ID of the user-unique key, a time stamp and/or information pertaining to a subject of the communication. This, in turn, provides a "fingerprint" that reflects who did what modification at which point in time. As a result, the efficiency of any future modifications and/or fault diagnosis operations performed in respect of the vehicle may be further enhanced.

According to yet another embodiment of this aspect of the invention, the method involves the further steps of: comparing an identity of the connected key with the contents of a database defining unacceptable user unique keys, and if, with respect to the database, the key is found to be unacceptable; setting the software component of the connected key in an inactive authorization state. These steps are advantageous because they provide a central access control, without requiring an online connection to a central authorized database.

According to a further aspect of the invention the object is achieved by a computer program directly loadable into the internal memory of a computer, comprising software for controlling the above proposed method when said program is run on a computer.

According to another aspect of the invention the object is achieved by a computer readable medium, having a program recorded thereon, where the program is to make a computer control the above proposed method.

Hence, the invention offers a solution providing an external access to an on-board specification file, which strikes a reasonable balance between data security and handling flexibility.

Other features and advantages of the present invention will become apparent from the following description of the invention which refers to the accompanying drawings.

BRIEF DESCRIPTION OF THE DRAWING(S)

The present invention is now to be explained more closely by means of embodiments, which are disclosed as examples, and with reference to the attached drawings.

Figure 2:
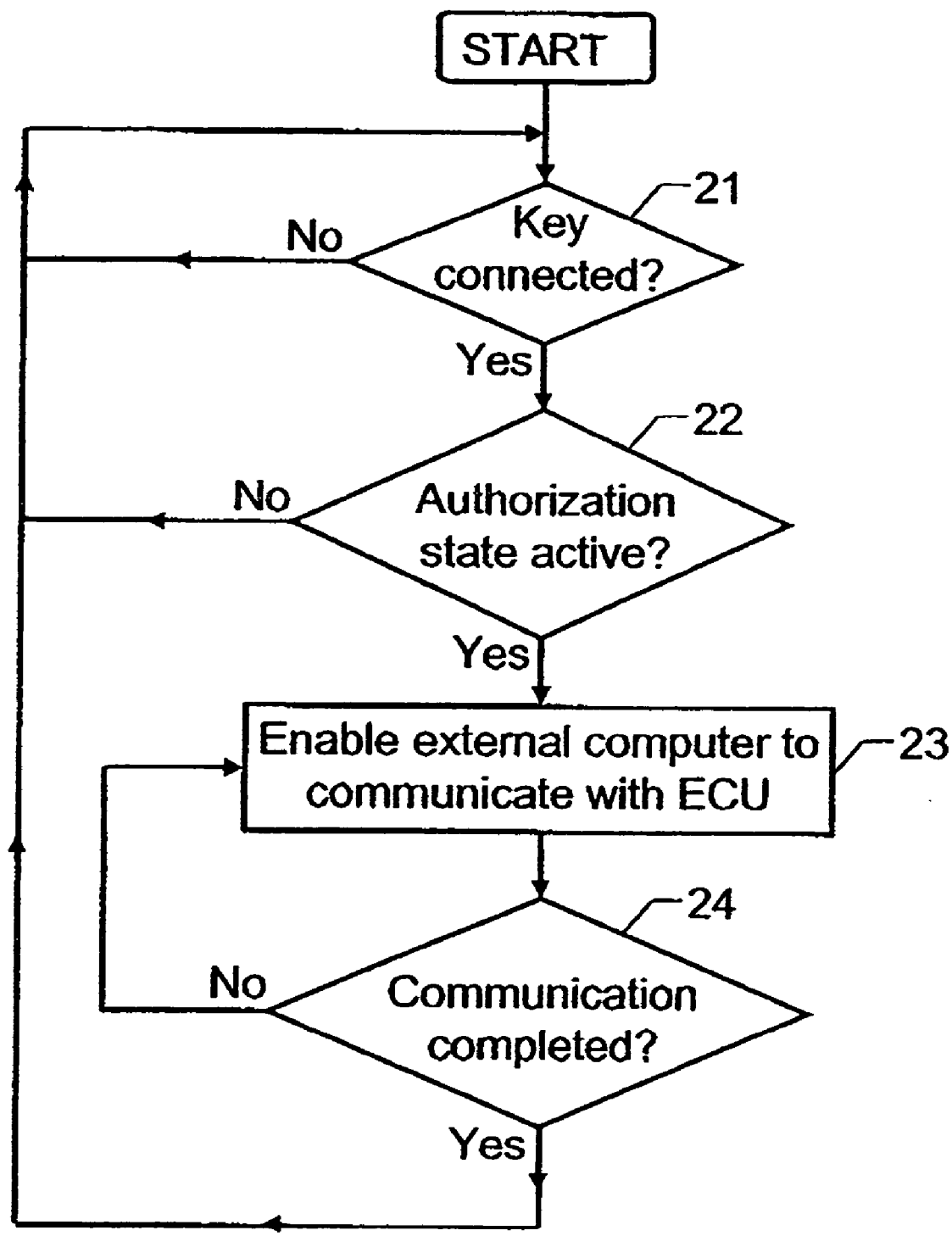

FIG. 1 shows a block diagram schematically illustrating an arrangement according to an embodiment of the invention, and FIG. 2 shows a flow diagram which illustrates the general method according to the invention.

DETAILED DESCRIPTION OF EMBODIMENTS OF THE INVENTION

FIG. 1 shows a block diagram, which schematically illustrates an arrangement according to an embodiment of the invention. A motor vehicle 100 includes a number of ECUs 120 and 130, two of which are shown in the figure. A first ECU 120 is connected to a first communication bus 105a in the vehicle 100. Thereby, the first ECU 120 may exchange data with other ECUs (not shown) that are connected to the first communication bus 105a. In this case, the first ECU 120 is also connected to a second and a third communication bus 105*b* and 105*c* respectively, such that the first ECU 120 may also communicate with ECUs connected to these busses, for instance a second ECU 130 on the second bus 105*b*.

It is further presumed that each of the first and second ECUs 120 and 130 is associated with at least one memory unit 140*a* and 140*b* respectively. Typically, this means that the first ECU 120 contains a first memory unit 140*a* and the second ECU 130 contains a second memory unit 140*b*. However, according to the invention, the memory units 140*a* and 140*b* may equally well be physically separate from the ECUs 120 and 130. In any case, each memory unit 140*a*, 140*b* stores a copy of a specification file 145, which describes a current configuration of the vehicle 100. Hence, the specification file 145 may include the vehicle's 100 product identity when it was built and any EOL (End of Line) programming, i.e. final parameter setting of the ECUs. Additionally, the specification file 145 may include information regarding later performed updates or modifications. This means that chassis number(s) and relevant component or part identifiers, such as article numbers, Functional Product Characteristic (FPC)-codes (i.e. codes designating which components that are present, and if several models or variants are possible, which model/variant), User Function (UF)-codes (i.e. codes which for each function specify the involved vehicular modules), and Use Case (UC)-codes (i.e. codes describing possible use cases for the vehicle) may be added. Moreover, it is preferable if additional information be included in the specification file 145, which is useful when performing service and fault diagnostics of the vehicle 100. To this end, so-called scenarios and clip-lists may also be described in the file 145. By scenario is here understood sequence diagrams which, for the particular vehicle, describe the chains of action that are possible, and how different signals are sent between relevant ECUs. The clip-lists are primarily the basis for producing the cables in the vehicle. However, the clip-lists may also be used to draw a dynamic circuit diagram for the particular vehicle. Therefore the clip-lists are useful as fault diagnostics tools.

In order to enable an external access to all copies of the specification file 145, a computer 200 is connected to the first communication bus 105*a*. According to an embodiment of the invention, an interface unit 115 inter-connects the bus 105*a* and an external communication bus 110 (e.g. a universal serial bus, USB), which in turn, is connected to a port 205*a* of the computer 200. Hence, the first communication bus 105*a* may have a first format, which is different from a second format of the external communication bus 110, and the interface unit 115 performs the necessary signal conversions between the first and second formats. The interface unit 115 may also function as a buffer unit between the first communication bus 105*a* and the external communication bus 110 irrespective of whether the first and second formats are identical or not.

The computer 200 includes a first module 210 and a second module 220. The first module 210 is adapted to communicate with the ECUs 120 and 130 over the first communication bus 105*a*. The second module 220 is adapted to present a result of any communication between the computer 200 and the ECUs 120 and 130. Thus, the second module 220 may include a driver to a graphical user interface (GUI), so that any operations performed in respect of the ECUs 120 and 130 and the result of such interactions may be displayed to a user of the computer 200, for instance on a display.

A user-unique key 300 is connected to a port 205*b*, e.g. of USB format, of the computer 200. The key 300, in turn, includes a software component 310, which is associated with an authorization state that may be set either active or inactive. In order to allow the computer 200 access to the specification file 145 in the memory unit 140*a* or 140*b* associated with the ECUs 120 or 130 respectively, an acceptable key 300 must be connected to the computer 200. The key 300 is only regarded as acceptable if its software component 310 is set in the active authorization state. The key 300 thereby controls the communication between the computer 200 and the ECUs 120 and 130, such that the computer 200 is only enabled to communicate with the ECUs 120 and 130 if the key 300 is connected to the computer 200 and the key's 300 software component 310 is set in the active authorization state. Of course, the key 300 must also fulfill any additional authentication requirements. For example, the so-called HASP automatic software protection tool may be used to provide a software protection for the communication between the computer 200 and the ECUs 120 and 130 in combination with authentication.

Moreover, according to an embodiment of the invention, it is required that the key 300 also is found to be acceptable with respect to the contents of a database 235 in the computer 200. Either the database 235 contains identities of all unauthorized user-unique keys, or the database 235 contains identities of all authorized user-unique keys. In any case, a third module 230 in the computer 200 compares the identity of the connected user-unique key 300 with the information in the database 235. If the identity is found to be unacceptable, the computer 200 sets the connected key's 300 software component 310 to the inactive authorization state. Hence, the database is an efficient tool to discard expired or stolen keys.

According to another embodiment of the invention, the first module 210 stores log data in the specification file 145. This means that information describing all specification-file-related communication between the computer 200 and the ECUs 120 and 130 is stored in the specification file 145. For example, the log data may specify the identity of the user-unique key 300 used, a time stamp and/or information pertaining to a subject of the communication. The subject of the communication, in turn, may indicate whether specification-file data was read out, or if the specification file 145 was updated in one or more of the memory units 140*a* and 140*b*, and if so which.

Naturally, in addition to the above-mentioned units and modules, the computer 200 preferably includes a central processing unit 240 adapted to control the computer 200 as explained above, and an internal memory 250 for storing a program, which describes control operations to make the computer 200 perform the steps according to the invention.

In order to sum up, the general method according to the invention will now be described with reference to the flow diagram of FIG. 2. It is presumed that specification-file-related data is to be exchanged between a memory unit associated with at least one ECU of a particular vehicle and a specific external computer connected to a communication bus of this vehicle.

A first step 21, checks whether a user-unique key is connected to an appropriate port of the external computer. If this is not the case, the procedure loops back and stays in the step 21. Otherwise a step 22 follows, which checks whether the key's software component is set in the active authorization state. If not, the procedure loops back to the step 21. However, if the software component is set in the active authorization state, a subsequent step 23 enables the external computer to communicate with the requested ECU(s). Finally, a step 24 checks whether any communication between the external computer and the ECU(s) has been completed. This check may be done either at certain intervals, or a specific time after that the traffic on the connection between the external computer and the vehicle has stopped.

As mentioned above, the traffic may be directed in both ways, i.e. involve reading out a specification file from at least one memory unit to an external memory unit and/or involve updating a specification file in the at least one ECU with a contents of an external memory unit.

All of the process steps, as well as any subsequence of steps, described with reference to the FIG. 2 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The invention is not restricted to the described embodiments in the figures, but may be varied freely within the scope of the claims.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of accessing a specification file stored in a memory unit associated with an electronic control unit, the electronic control unit being connected to a first communication bus, the method comprising:
   checking an authorization state of a software component of a user-unique key connected to a computer, the computer, in turn, being configured to communicate with the electronic control unit over the first communication bus;
   enabling the computer to communicate with the electronic control unit to access the specification file provided that the connected key is set in an active authorization state;
   comparing an identity of the connected key with information in a database defining unacceptable user-unique keys and if with respect to the database the connected key is found to be unacceptable, setting the software component of the connected key in an inactive authorization state.

2. A method according to claim 1, wherein the communication between the computer and the electronic control unit comprises reading out the specification file from the memory unit to an external memory unit associated with the computer.

3. A method according to claim 1, wherein the communication between the computer and the electronic control unit comprises updating the specification file in the memory unit with content of an external memory unit associated with the computer.

4. A method according to claim 3, further comprising logging data in respect to any specification-file-related communication between the computer and the electronic control unit in the specification file.

5. A method according to claim 4, wherein the logged data includes at least one of a user ID of the user-unique key, a time stamp and information pertaining to a subject of the communication.

6. A computer program directly loadable into the internal memory of a computer, comprising software for controlling the steps of claim 1 when the program is run on the computer.

7. A computer readable medium, having a program recorded thereon, wherein the program is to make a computer control the steps of claim 1.

8. A method according to claim 1, wherein the electronic control unit is in a vehicle.

* * * * *